O. A. BREMER.
CONNECTING ROD BABBITTING JIG.
APPLICATION FILED JULY 19, 1917.

1,304,538. Patented May 27, 1919.

Witnesses,
Willis King
B. G. Richards

Inventor
Otto A. Bremer
By Joshua R. H. Potts
his Attorney

UNITED STATES PATENT OFFICE.

OTTO A. BREMER, OF BURLINGTON, IOWA.

CONNECTING-ROD-BABBITTING JIG.

1,304,538.  Specification of Letters Patent.  Patented May 27, 1919.

Application filed July 19, 1917. Serial No. 181,516.

*To all whom it may concern:*

Be it known that I, OTTO A. BREMER, a citizen of the United States, and a resident of the city of Burlington, county of Des Moines, and State of Iowa, have invented certain new and useful Improvements in Connecting-Rod-Babbitting Jigs, of which the following is a specification.

My invention relates to improvements in connecting rod babbitting jigs, and has for its object the provision of an improved construction of this character whereby the crank shaft bearings of connecting rods for gasolene engines or the like, may be readily babbitted.

The invention consists in the combinations and arrangements of parts hereinafter described and claimed.

Figure 1:
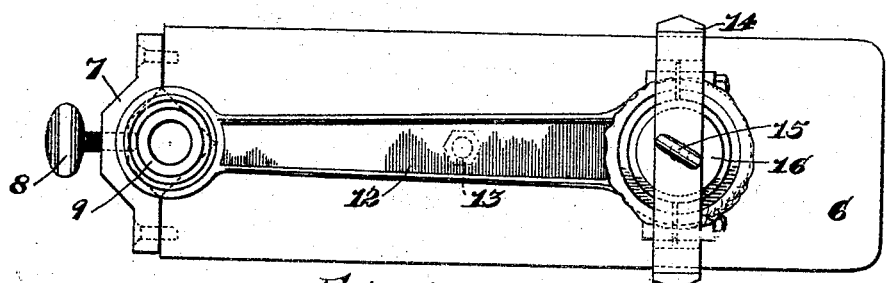
Figure 2:
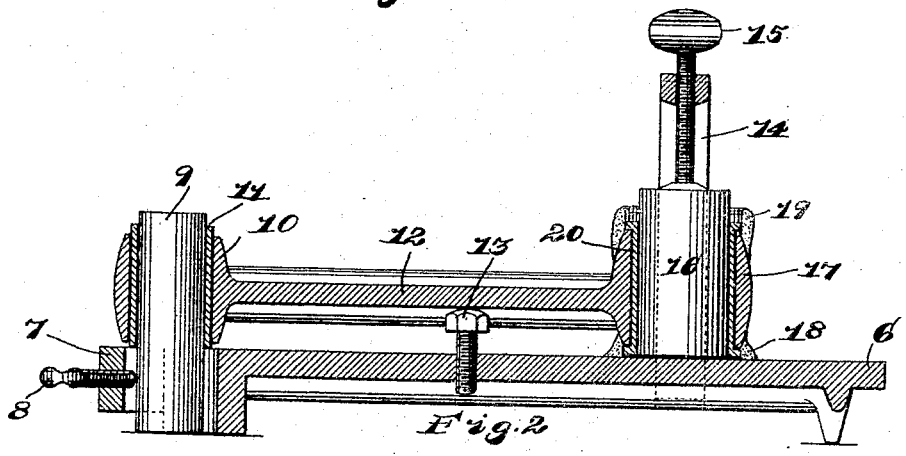
Figure 3:
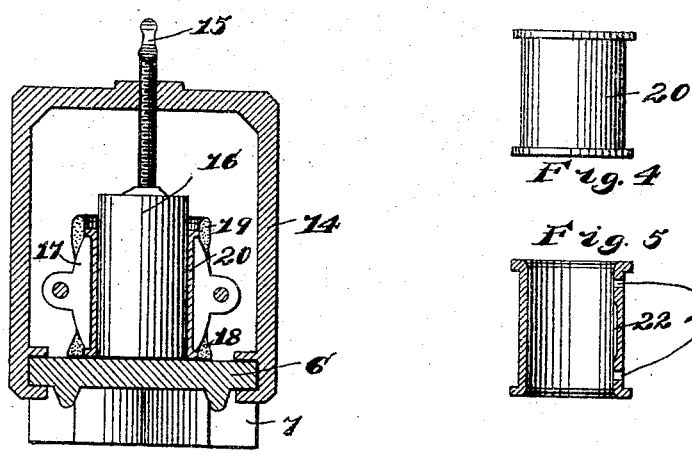
Figure 4:
Figure 5:
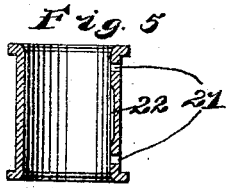

The invention will be best understood by reference to the accompanying drawings forming a part of this specification, and in which, Figure 1 is a top plan view of a jig, embodying my invention, Fig. 2, a longitudinal section of the same, Fig. 3, a transverse section of the same, Fig. 4, a side view of a bearing formed in the jig shown detached, and Fig. 5, a section of said bearing.

The preferred form of construction, as illustrated in the drawings comprises a base plate 6 having a smoothly finished upper surface and provided at one end with a strap 7 provided with a clamping screw 8 forming a clamping socket for the reception and holding of a positioning pin 9 at right angles to the finished upper surface of plate 6, as indicated. The arrangement is designed to permit of the positioning of the usual piston bearing 10 having the usual bushing 11 therein of an ordinary explosive engine connecting rod 12 over the pin 9, the pin 9 being either the identical pin used for connecting the connecting rod with the piston or a duplicate thereof. An adjustable support in the form of a set screw 13 is arranged on base plate 6 to project upwardly substantially centrally therefrom and constitute a support for the underside of the connecting rod, as shown, to position said connecting rod parallel with the plate 6 and perpendicular to the axis of pin 9. A yoke 14 is arranged to slide along the edges of plate 6 as indicated and is equipped with a set screw 15 adapted to bear against the upper end of a core 16, for the other bearing 17 of the connecting rod.

In use the set screw 13 is adjusted to properly position the connecting rod as indicated, and the core 16 clamped in place centrally in the bearing 17. Then dams 18 and 19 are formed of fire clay or the like about the lower and upper edges of bearing 17 and the bearing 20 cast out of molten Babbitt metal in the usual manner. If it is desired to retain the babbitted bearing in the bearing hub 17, suitable holes are provided in the bearing hub 17 into which the molten babbitted metal flows, thus anchoring the babbitted bearing. If it is desired to remove the bearing, these holes are omitted or plugged up whereupon the bearing may be readily removed when cast. Where this is done the finished bearing 20 is preferably split as by a hack-saw and oil holes 21 and an oiling groove 22 provided therein. By this latter method the babbitted bearings may be made in quantities and kept in stock for future use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A jig for babbitting bearings in connecting rods comprising a base plate having a smooth upper surface; a clamp arranged at one end of said base plate and adapted to clamp a positioning pin; an adjustable support projecting upwardly from said base plate and adapted to contact with the underside of a connecting rod positioned on a pin held in said clamp; and adjustable means for positioning a core upright on said plate, substantially as described.

2. A jig for babbitting bearings in connecting rods comprising a base plate having a smooth upper surface; a clamp arranged at one end of said base plate and adapted to clamp a positioning pin; an adjustable support projecting upwardly from said base plate and adapted to contact with the underside of a connecting rod positioned on a pin held in said clamp; and an adjustable yoke on said base plate having a set screw adapted to contact with the top of a core in the other bearing of said connecting rod, substantially as described.

In testimony whereof I have signed my name to this specification in the presence of two subscribing witnesses.

OTTO A. BREMER.

Witnesses:
  JOSHUA R. H. POTTS,
  HELEN F. LILLIS.